United States Patent
Saunders et al.

(10) Patent No.: US 7,088,436 B2
(45) Date of Patent: Aug. 8, 2006

(54) INTEGRATED OPTICAL TIME DOMAIN REFLECTOMETER AND OPTICAL SUPERVISORY NETWORK

(76) Inventors: Ross Alexander Saunders, 36-110 Havelock Street, Ottawa, Ontario (CA), K1S 5L3; Enos Avid Lemus-Tejada, 2023-195 Clearview Avenue, Ottawa, Ontario (CA), K1Z 6S1; Sanjay Kalyanasundaram, 804-1310 Pinecrest road, Ottawa, Ontario (CA), K2C 3N8; Meng Soo, 166 Centrepoint Drive, Nepean, Ontario (CA), K2G 5C2

( * ) Notice: Subject to any disclaimer, the term of this patent is extended or adjusted under 35 U.S.C. 154(b) by 0 days.

(21) Appl. No.: 09/943,077

(22) Filed: Aug. 30, 2001

(65) Prior Publication Data

US 2003/0210387 A1 Nov. 13, 2003

Related U.S. Application Data

(60) Provisional application No. 60/251,136, filed on Dec. 4, 2000.

(51) Int. Cl.
*G01N 21/00* (2006.01)

(52) U.S. Cl. ................................................ 356/73.1
(58) Field of Classification Search ................ 356/73.1; 359/110, 143, 177, 337, 341, 135
See application file for complete search history.

(56) References Cited

U.S. PATENT DOCUMENTS

| | | | |
|---|---|---|---|
| 5,570,217 A | | 10/1996 | Fleuren |
| 5,926,263 A | | 7/1999 | Lynch et al. |
| 6,005,694 A | | 12/1999 | Liu |
| 6,122,044 A | | 9/2000 | Gautheron et al. |
| 6,222,668 B1 | * | 4/2001 | Dutrisac et al. ............ 359/337 |
| 6,510,000 B1 | * | 1/2003 | Onaka et al. ................ 359/334 |
| 6,583,909 B1 | * | 6/2003 | Wada .......................... 398/177 |
| 6,594,047 B1 | * | 7/2003 | Ballintine et al. ............ 398/79 |

FOREIGN PATENT DOCUMENTS

EP 0 652 651 A1 5/1995

OTHER PUBLICATIONS

Lee et al., A Practical In-Service Supervisory Technique Using Reflected-Pulse Detection Based on OTDR for Optically Amplified Passive Branched CATV Networks, IEE Photonics Technology Letters, vol. 11, No. 5, May 1999, pp. 611-613.

Photon Probe: An Optical-Fiber Time-Domain Reflectomer, Personick, Bell Systems Technical Journal, vol. 56, No. 3, Mar. 1977, 56:355.

Theory of Backscattering Effects in Waveguides, Kapron, F., R. Maurer & M. Teter, Applied Optics, vol. 11, No. 6, Jun. 1972, 1352-1356.

New OTDR Testing Techniques for Cable and Fiber Production Environments, A. Lara., http://www.exfo.com.

* cited by examiner

*Primary Examiner*—Tu T. Nguyen

(57) ABSTRACT

An integrated OTDR/OSC mechanism for monitoring an optical transport system without disrupting the normal service. The invention combines two essential network components in an integrated mechanism. These components are the mandatory OSC function as part of any DWDM network, and the in-skin, in-service attributes of the OTDR engine. One pair of control wavelengtbs is sufficient to perform both OSC and OTDR functionalities. In this way, distributed control function, OTDR procedures, and fiber monitoring is achieved, while trace acquisition from anywhere in the network becomes possible. By bringing these two essential network components together, the invention allows for superior network management and reduction in maintenance costs. This is primarily due to the fact that the invention allows to use and control the OTDR engine remotely, while the combination with the OSC function allows rapid implementation of the OTDR procedures on operating channels within each fiber of a cable.

19 Claims, 3 Drawing Sheets

INTEGRATED OPTICAL TIME DOMAIN REFLECTOMETER AND OPTICAL SUPERVISORY NETWORK

CROSS-REFERENCE TO RELATED APPLICATIONS

This application claims the benefit of U.S. Provisional Application Ser. No. 60/251,136, filed Dec. 4, 2000.

BACKGROUND OF THE INVENTION

1. Field of the Invention

The invention generally relates to optical transport systems and more particularly relates to an optical time domain reflectometer integrated with an optical supervisory channel.

2. Related art

Spurred by the growth in information technology and the need to transmit large amounts of data, fiber optics has become the backbone-networking technology of choice in the last decade. In the arena of fiber optics, the idea of using multiple wavelengths to transmit information in a single fiber, called Dense Wave Division Multiplexing (DWDM), combined with the amplification in the optical domain has reduced the cost of building-out large optical networks. This has been achieved by reducing the need to install electrical regenerator equipment every few kilometers; optical amplifiers increase the power of all channels passing through them. This, together with the increase in the spacing between optical amplification equipment to 60–80 kilometers in the newer networks, resulted in important cost savings.

However, large-scale networks with such advanced technology components have made testing and maintenance of these networks a complex, yet inevitable procedure. The various components in the networks such as multiplexing/de-multiplexing equipment, optical amplifiers, and the fiber used to connect these components have to be tested to ensure they are operating at the peak of their capabilities.

Testing of the optical network components occurs when the networks are being installed, maintained and during trouble-shooting problems.

One of the recent advancements in the area of testing fiber characteristics is the use of Optical Time Domain Reflectometers (OTDR). The OTDRs measure the loss of optical signal strength in a section and the total loss encountered in an end-to-end network by tracking the attenuation in the optical signal. The OTDR operates by launching a short pulse of light of a predetermined wavelength (frequency) into the fiber, and measuring the reflected signal as a function of time.

Reflections are mainly due to the phenomena known as Rayleigh scattering and Fresnel reflections, which cause that a part of the transmitted optical signal to be reflected back via the optical fiber. The Rayleigh effect relates to power attenuation along the fiber due to back and forth scattering, fiber imperfection, and absorption of light due to impurities in the fiber. The Fresnel effect relates to the interference of two light spots generated by the same source, the reflected spot being delayed relative to the original spot.

Due to back and forth scattering in the transmission medium, delays are introduced in the reflected waves. Such delays are induced by the fiber characteristics, manufacturing nonlinearities, reflections at the optical connectors, splices, kinks or breaks, etc. If a detector is located on the same optical path as the source, the Rayleigh scattering may be measured with accuracy, and knowing the speed of the light, the spatial location of such events can be determined.

The OTDR measurements provide an OTDR trace which helps identify the distance between irregularities, and their contribution to optical signal degradation. This instrument can detect extremely weak reflections from fiber breaks with about 50 centimeters distance resolution, and also estimate the attenuation of the optical signal relative to signal position in the fiber. The OTDR provides this information non-destructively, from one end of the fiber. Further on, the information is used for testing and monitoring the optical system components during normal system operation.

For example, based on OTDR measurements, the splice loss (reflectance) can be estimated and this information is used to detect alignment of fibers during splicing, degradation profiles and breaks or damages in the fiber. OTDRs are also used to do pre-installation testing, acceptance testing, predictive maintenance, and/or troubleshooting in optical networks.

Typically, the OTDR equipment is provided as a separate (ex-network) testing device, and operates generally when there is no traffic on the fiber under test, because the diagnostic pulses interfere with the traffic signal. When there is a need to characterize a fiber link, the head-end of the fiber is disconnected from the network device and plugged into an OTDR port. As mentioned above, such monitoring techniques are tied to an end of the optical fiber connection and also require intervention in the transmitting equipment.

An in-service OTDR device is described in U.S. Pat. No. 5,570,217 issued Oct. 29, 1996 to Fleuren. The OTDR technique described by Fleuren allows system monitoring during operation at any point where the optical fiber is accessible to optical uncoupling means, such as "clip-on" procedure.

A side-tone OTDR for in-service optical cable monitoring is described in U.S. Pat. No. 5,926,263 issued to Lynch et al. on Jul. 20, 1999. When the OTDR of Lynch et al. provides in-service measurement information, the test signals (in the form of side-tone pulses) are at a low level and sufficiently offset from the wavelength of the traffic signal to minimize interference. When the device is used in a wavelength division multiplexing (WDM) system, the wavelength offset of the test signals must be small enough to pass through the narrow bandpass filter of the OTDR receiver along with the dropped/added traffic, yet be far enough away to avoid interference. In addition, in an WDM system, the out-of-service procedure may be applied to one or more traffic wavelength assignments, while other wavelengths on a fiber pair are still carrying traffic.

Both OTDR devices described above, generate pulses that travel along the fiber in parallel with the traffic and the control signals, while the OTDR trace is available only at repeaters which include the OTDR mechanism.

There is a need to provide a network with an on-line device for measuring reflections and providing a OTDR trace anywhere in the network.

In DWDM networks, a pair of wavelengths (typically at 1610 and 1625 nm) is dedicated to a bidirectional Optical Supervisory Channel. Optical Supervisory Channel (OSC) is a technique used to transport network management data between optical amplifiers. OSC functionality is usually provided for on a separate card present at amplification nodes. OSC technologies have progressed considerably in recent years. In particular, advanced data communications technologies are now used in conjunction with optical solutions to design network overlays as described for example in applicant's patent application "QoS based supervisory network for optical transport networks" Ser. No. 60/251,136, filed on Dec. 4, 2000, and assigned to the same applicant.

The OTDR is a mainstream test device. The OSC is usually designed as a part of the network equipment vendor's offering. Thus, the OTDR and OSC are two known technologies that are currently implemented by separate devices.

There is a need to simplify network engineering by providing a unique supervisory layer which combines network control and OTDR functionality on integrated network management platforms distributed within the network, to allow acquisition and monitoring the OTDR trace from anywhere in the network.

SUMMARY OF THE INVENTION

The present invention seeks to overcome the disadvantages of the prior art associated with monitoring, testing, installation and maintenance of optical transport systems. It provides an integrated mechanism to monitor and characterize a fiber link, by combining OTDR functionality with the optical supervisory channel (OSC) optics and electronics.

According to one aspect of the invention, an optical supervisory channel apparatus provided with an integrated time domain reflectometer is presented. The apparatus comprises OSC equipment, a pulse generator for providing a diagnostic pulse, a light source for launching an optical diagnostic signal comprised of a supervisory channel modulated with the pulse over a strand of fiber; a receiver for detecting a reflected variant of the optical diagnostic signal generated by irregularities in the fiber strand; and means for extracting reflectometry information from the reflected variant, wherein the light source is used for launching the optical diagnostic signal over the supervisory channel whenever the apparatus operates in a diagnostic mode, and is used for transmitting the supervisory channel in normal operation mode.

The OSC equipment comprises a microprocessor for processing supervisory information carried over the supervisory channel including processing said interference signal to obtain a power versus distance graph and locate reflections occurring along the fiber strand.

Post-processing capabilities are made available at any attached terminal for displaying the interference signal, such that the in-skin, in-service, integrated OTDR/OSC mechanism of the invention advantageously provides for a distributed control through OTDR measurement information and trace acquisition from anywhere in the network.

By bringing two essential network components together, the invention allows for superior network management and reduction in maintenance costs. This is primarily due to the dual functionality of the combined OTDR/OSC which is housed on the same physical card. Moreover, the presence of the OSC function permits remote control of the OTDR engine and rapid implementation of OTDR procedures on operating channels within each fiber of the cable.

The invention also provides for remote management of the network since it allows to localize faults in the system from any network operation control (NOC) stations.

The "Summary of the Invention" does not necessarily disclose all the inventive features. The invention may reside in a sub-combination of the disclosed features.

BRIEF DESCRIPTION OF THE DRAWINGS

The invention will be now explained by way of example only and with reference to the following drawings.

Similar references are used in different figures to denote similar components.

DETAILED DESCRIPTION OF THE PREFERRED EMBODIMENT

The following description is of a preferred embodiment by way of example only and without limitation to combination of features necessary for carrying the invention into effect.

Figure 1:
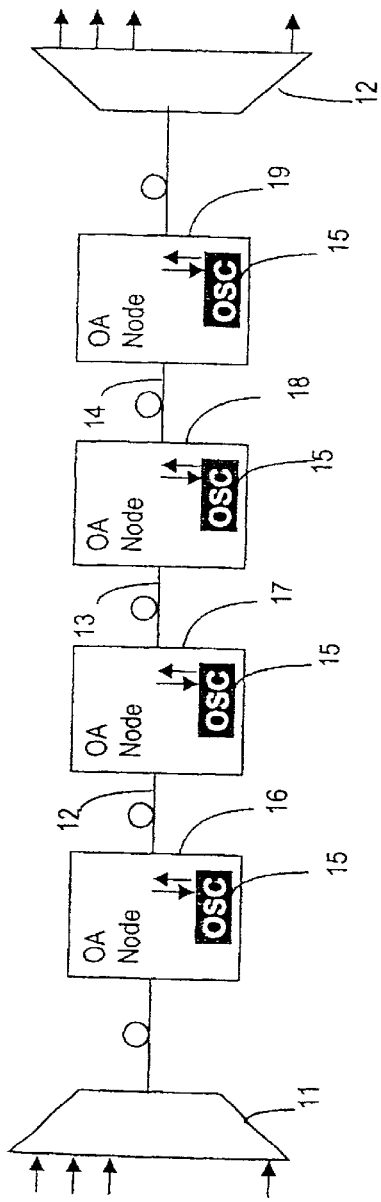
FIG. 1 is a schematic diagram of a typical uni-directional DWDM network.

FIG. 1 is a schematic diagram of a typical uni-directional DWDM network including multiplexing nodes 11, 12, and amplification nodes 16 to 19. The multiplexing node 11 combines a plurality of channels, each channel carrying data (an information signal) optically modulated over a carrier wavelength. The multi-channel signal output by the node 11 travels towards demultiplexing node 12 along the same fiber. If the distance between node 11 and node 12 is large, the power of the multichannel signal needs to be amplified with a certain gain every 60–80 km. Thus, each amplification node 16 to 19 is provided with an optical amplifier which amplifies all channels in the multichannel signal. As shown in FIG. 1, OSC optics and electronics equipment, or card 15 is present in all amplification nodes 16 to 19. OSC equipment 15 drops management data to the associated optical amplifier to control its operation, and adds data that provides information on functionality of the associated optical amplifier. This information is transported between nodes 16 to 19 over the transport OSC infrastructure.

Figure 2:
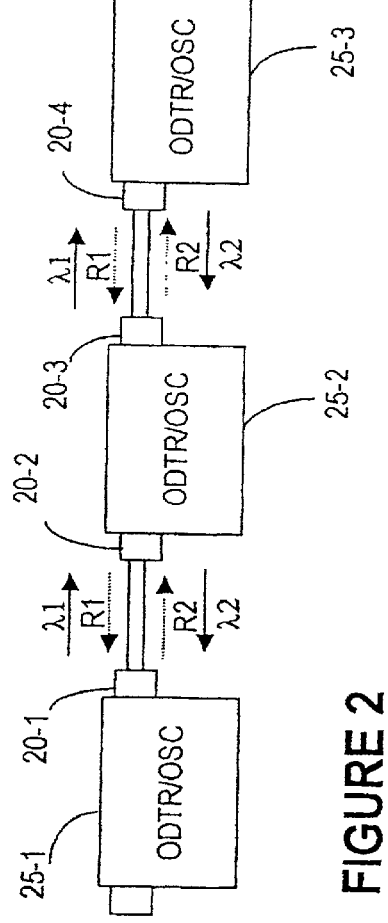
FIG. 2 is a schematic diagram illustrating integrated OTDR/OSC cards operating in an amplifier chain, according to the invention.

FIG. 2 is schematic diagram illustrating an integrated OTDR/OSC card 25-1, 25-1, 25-3, operating in an amplifier chain, according to the invention. The combined, or integrated OTDR/OSC equipment is housed on the same physical card. The OTDR becomes thus an in-skin, in-service device that only requires access to the two channels (1610 nm and 1625 nm) used for the OSC function.

A control mechanism is associated with the OTDR/OSC integrated device, which is provided as embedded software/hardware solution. In conjunction with the embedded control system, a non-embedded software component is also provided and acts as the user-interface to the system, allowing OTDR trace acquisition anywhere in the network as well as monitoring/provisioning OTDR parameters.

The same wavelengths as for the OSC are used for the integrated OTDR/OSC device. These wavelengths are used as bi-directional OSC wavelengths during normal operation of the network. In FIG. 2, the wavelength $\lambda 1$ at 1610 nm is shown as a black arrow in the east direction. This wavelength is launched by cards 25-1 and 25-2 in the through couplers 20-1 and 20-3. The reflected optical signal R1 is shown as a dotted arrow that is associated with the $\lambda 1$ arrow. Similarly, OTDR/OSC cards 25-2 and 25-3 are shown to launch the wavelength $\lambda 2$ at 1625 nm in the west direction through couplers 20-2 and 20-4. The reflected optical signal R2, travels in the opposite direction.

Figure 3:
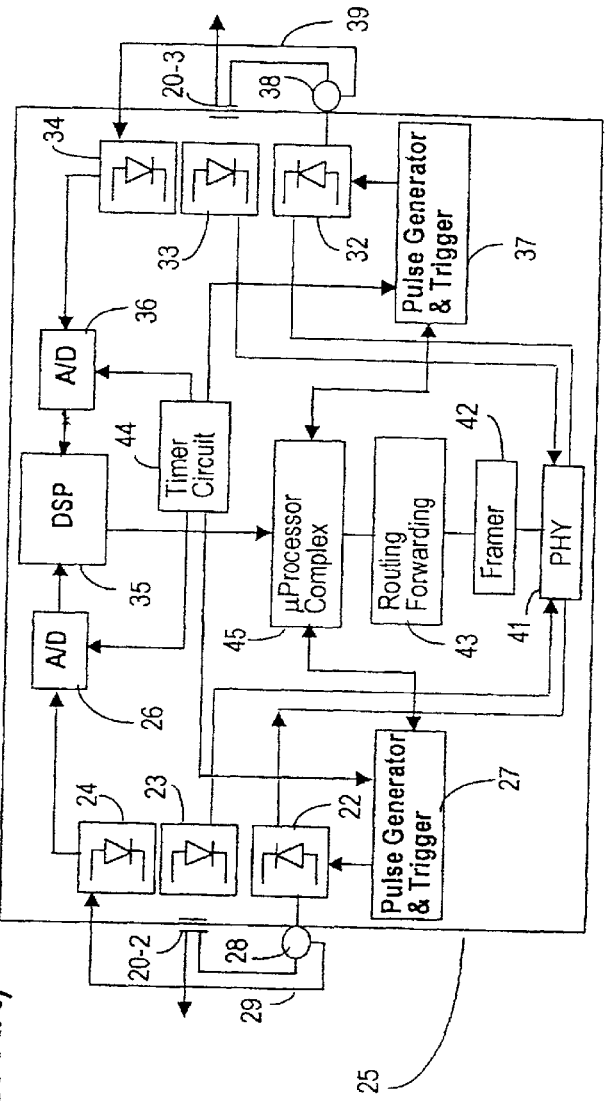
FIG. 3 is a block diagram illustrating of the integrated OTDR/OSC card of FIG. 2.

The details of system operation and inter-working between the integrated OTDR/OSC integrated device and the optical network are described next in connection with FIG. 3. FIG. 3 is a block diagram illustrating a combined OTDR/OSC equipment 25. Pulse generators 27, 37, hi-sensitivity reflection detectors 24, 34, analog-to-digital convertors 26, 36, and a digital signal processing (DSP) chip 35 are key components that enable the OTDR functionality.

Typical OSC optic and electronic components like laser diode transmitters (Tx) 22, 32, positive intrinsic negative photodiode (PIN) receivers (Rx) 23, 33, physical layer entity 41, framer 42, routing and forwarding engine 43, microprocessor 45, and timer 44 are also shown in FIG. 3.

In the diagnostic mode, the microprocessor 45 activates the pulse generators 27, 37, to generate a pulse to be inputted into the laser source (Tx) 22, 32. Transmitters 22, 32, send an optical diagnostic pulse ($\lambda_1, \lambda_2$) in opposite directions into the fiber under evaluation through the fiber connectors 20-2 and 20-3, respectively. In order to provide a larger sample space for the analysis, a series of pulses, or a pseudo-random bit stream, may be launched into the fiber. The optical diagnostic pulse, or the test signal, is reflected back in the fiber and received at the very sensitive receivers 24, 34. Receivers 24, 34, may be for example, an Avalanche Photo Diode (APD). Diodes 24, 34, generate an analog (electrical) signal which is inputted to the Analog to Digital (A/D) converters 26, 36.

The Digital Signal Processing (DSP) chip 45 receives the digitized signal from the A/D converters 26, 36, and performs signal conditioning on the received signal. Since a series of pulses are sent into the fiber, a plurality of reflected signals are averaged at the DSP chip 35 to get the best possible fiber profile. The sampling rate of converters 26, 36, determines the number of points available for analysis and the spatial resolution. A typical sampling rate of 50 Hz is equivalent to a spatial resolution of 2 m.

The information obtained from these calculations over the length of the fiber under test, results in the OTDR trace. As mentioned before, the OTDR trace is a map of the conditions and events which characterize the fiber such as event location, length of fiber optic link, attenuation, attenuation coefficient, splice loss, reflection coefficient, return loss, etc.

Figure 4:
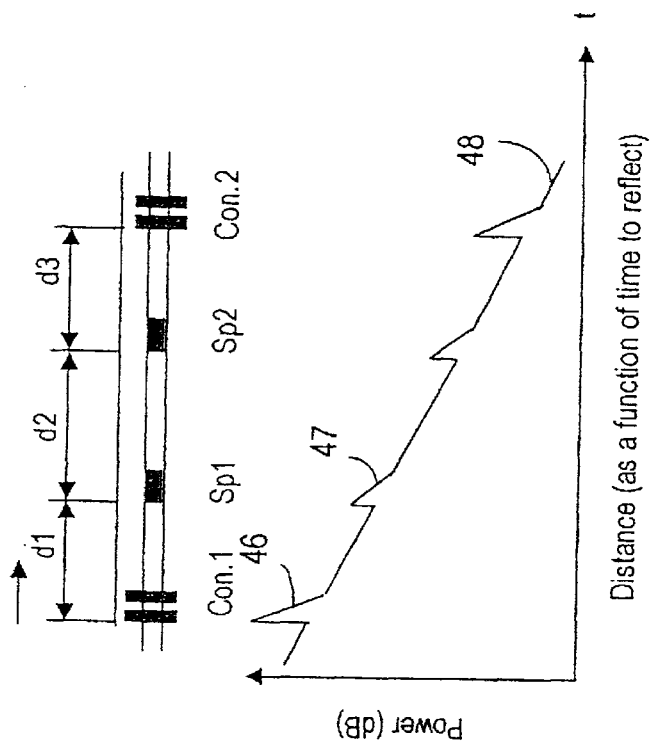
FIG. 4 is a typical OTDR trace.

A sample profile of the received signal versus time is shown in FIG. 4. This profile may be also considered as a plot of signal attenuation versus distance for a typical OTDR trace 48. The back reflected waves generated by optical irregularities are converted into electrical reflected signals, and correlated by the OTDR device 25 with the original electrical diagnostic signal ($\lambda_1, \lambda_2$). To perform the correlation, timer 44 provides a suitable delay for the original electrical diagnostic signal ($\lambda_1, \lambda_2$) with respect to the reflected signal. The result of this correlation is an interference signal which may be delivered to a screen or a plotter.

As shown for example in FIG. 4, the diagnostic pulse ($\lambda_1$) launched through connector-1 in the east direction, reaches connector-2 with a visible power attenuation. Each optical irregularity like connector-1 or splice-1, generates an interference signal which is evidenced on plot 48 by bumps 46, 47, at various distances d1, d2, d3. The OTDR trace 48 allows monitoring of the fiber link using the bumps 46, 47, and the sloping sections of the plot 48 as measurement information. Distances d1, d2, d3 are calculated as a function of time to reflect. The OTDR trace 48 linearity defines the OTDR instrument's ability to produce a straight line for accurate measurements function of power. A curved OTDR trace 48 gives a higher splice loss than a linear one.

The OTDR functionality in the OTDR/OSC card 25 is managed by a control component (not shown). The control component has a mechanism to modify the sampling rate of the optical diagnostic pulses in order to get better OTDR traces 48. The control component also manages the transition between the OTDR and the OSC modes. In addition, it controls the optical components, distributes timing information, and monitors OTDR specific parameters.

Specific OTDR parameters to be monitored/provisioned may include dynamic range, loss resolution, spatial resolution, level accuracy, pulse width. The dynamic range is a combination of pulse strength (sent by Tx 26, 36) and the sensitivity of the sensor (Rx 24, 34) on the receive side. Loss resolution implies sensor's (24, 34) capability to distinguish different levels of reflected signal powers and whenever the detected reflected signal power is below a threshold, an alarm is activated. The spatial resolution is the distance, e.g. d1, d2, d3, between the individual data points in the OTDR trace 48. The level accuracy is a measure of how close the electrical output tracks the optical power. The pulse width is a provision-able parameter with a default width.

There is no on-board display such as cathode ray tube (CRT), or liquid crystal display (LCD) for the OTDR engine on the OTDR/OSC card 25. The data points collected for the OTDR trace 48 are sent to the host microprocessor 45 residing on the OTDR/OSC card 25. The OSC function provides a standard way to transport this data to any target platform in the network. For example, a packet oriented control network can be used to achieve this transport as described in applicant's application "QoS based supervisory network for optical transport systems", mentioned before.

Figure 5:
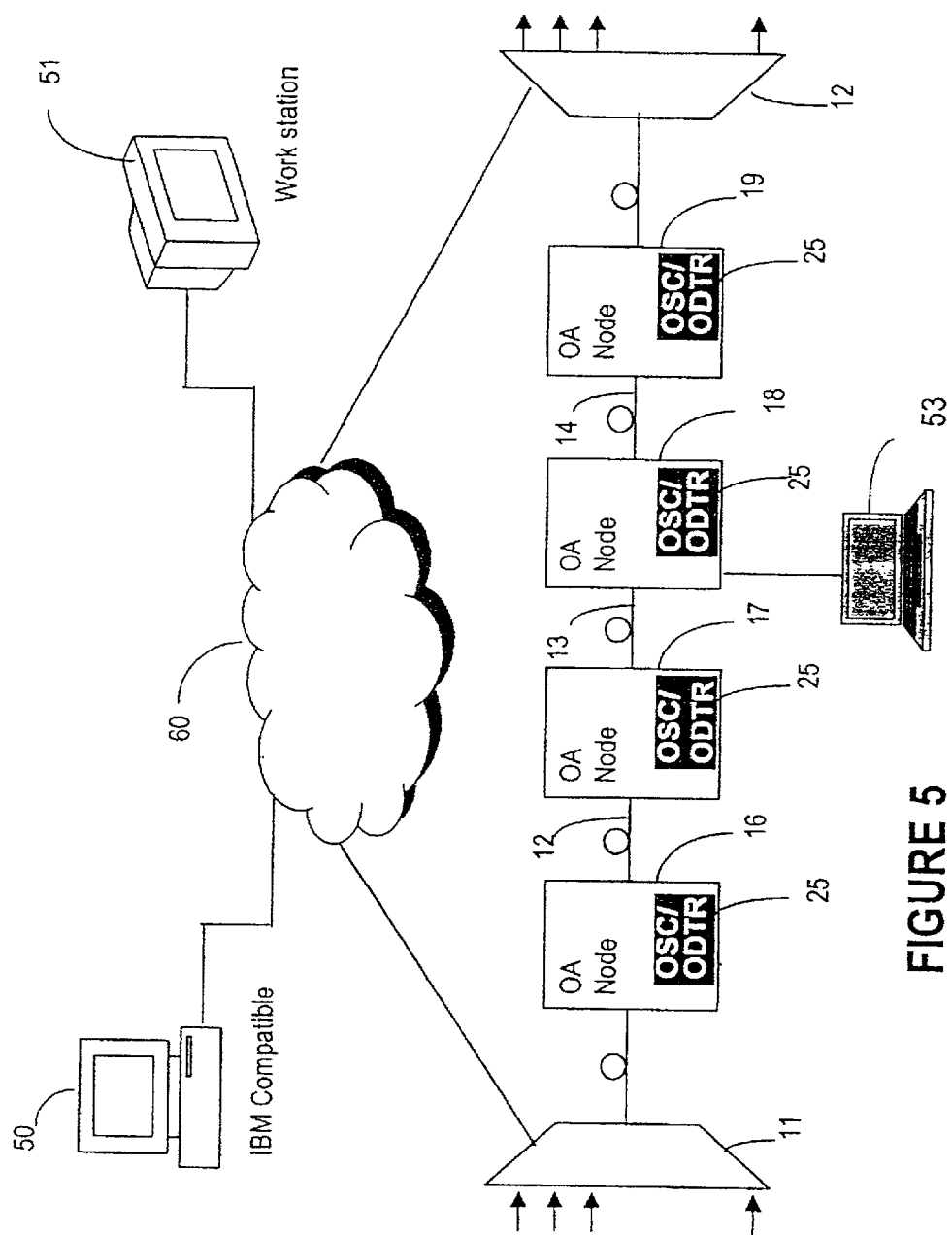
FIG. 5 illustrates how the OTDR trace can be accessed anywhere in a network equipped with the integrated OTDR/OSC card of FIG. 3.

FIG. 5 illustrates how the OTDR trace 48 can be accessed on a network equipped with the OTDR/OSC card 25 of FIG. 3. The optical transport system includes multiplexing nodes 11, 12, and amplification nodes 16 to 19. The data collected and processed by the DSP chip 35 are passed onto the microprocessor 45. The microprocessor 45 then uploads the information onto a Network Management Platform such as a UNIX, or Windows server. Such a platform includes the post-processing software.

The post-processing software correlates the information from the OTDR/OSC card 25 and through its graphics engine generates the OTDR trace 48. The graphics engine can be a $3^{rd}$ Party Java based software that can be obtained off-the-shelf and can be integrated into the network management software with the local graphic interface.

Preferably, the microprocessor 45 allows switching from OTDR procedures to OSC function, especially where OTDR and OSC share the same transmitter.

The significance of the control and post-processing component on the OTDR/OSC card 25 is that it provides a way to monitor the OTDR trace 48 from anywhere in the optical network, or on the customer data communication network, shown at 60. In long haul and ultra long haul network deployments, certain parts of the network are not easily accessible. In such cases, a distributed control and post-processing OTDR platform is invaluable to service providers.

In the example of FIG. 5, the OTDR trace can be obtained on a laptop computer 53, an IBM compatible personal computer 50, a workstation 51, or any network management platform connected to the customer data communications network 60.

The combination with the OSC function according to the invention allows for remote system management since the OTDR engine can be used and controlled remotely, while allowing to localize faults form NOC stations and rapid implementation of OTDR procedures on the operating channels within each fiber of a cable.

Numerous modifications, variations, and adaptations may be made to the particular embodiments of the invention without departing from the scope of the invention which is defined in the claims.

We claim:

1. An optical supervisory channel apparatus provided with an integrated time domain reflectometer, comprising:
    OSC equipment;
    a pulse generator for providing a diagnostic pulse;
    a light source for launching an optical diagnostic signal comprised of a supervisory channel modulated with said pulse over a strand of fiber;
    a receiver for detecting a reflected variant of said optical diagnostic signal generated by irregularities in said fiber strand; and
    means for extracting reflectometry information from said reflected variant, wherein said light source is used for launching said optical diagnostic signal over said supervisory channel whenever said apparatus operates in a diagnostic mode, and is used for transmitting said supervisory channel in normal operation mode.

2. An apparatus as claimed in claim 1, wherein said receiver is a high sensitivity reflection detector.

3. An apparatus as claimed in claim 1, wherein said receiver is an avalanche photodiode.

4. An apparatus as claimed in claim 1, wherein said means for extracting reflectometry data comprises an analog-to-digital converter for converting said reflected variant from an analog to a digital format.

5. An apparatus as claimed in claim 4, wherein said means for extracting reflectometry data comprises a DSP for receiving said digital reflected variant from said analog-to-digital converter and a delayed variant of said diagnostic pulse and processing same to obtain an interference signal.

6. An apparatus as claimed in claim 5, wherein said OSC equipment comprises a microprocessor for processing supervisory information carried over said supervisory channel and for processing said interference signal to obtain a power versus distance graph and locate reflections occurring along said fiber strand.

7. An apparatus as claimed in claim 6, further comprises post-processing capabilities at a terminal attachable to said apparatus for displaying said graph.

8. An apparatus as claimed in claim 6, wherein said interference signal is processed by said microprocessor to obtain OTDR information.

9. An apparatus as claimed in claim 8, wherein said OTDR information is provided to a network manager over said OSC for remote implementation of OTDR procedures on operating channels.

10. An apparatus as claimed in claim 8, wherein said OTDR information is used to monitor and provision dynamic range.

11. An apparatus as claimed in claim 8, wherein said OTDR information is used to monitor and provision loss resolution.

12. An apparatus as claimed in claim 8, wherein said OTDR information is used to monitor and provision spatial resolution.

13. An apparatus as claimed in claim 8, wherein said OTDR information is used to monitor and provision level accuracy.

14. An apparatus as claimed in claim 8, wherein said OTDR information is used to monitor and provision pulse width.

15. An apparatus as claimed in claim 1, wherein said pulse generator provides a series of pulses for providing a large sample space.

16. An apparatus as claimed in claim 15, wherein said means for extracting reflectometry data comprises:
    an analog-to-digital converter for converting said reflected variant from an analog to a digital format;
    a DSP for receiving said digital reflected variant from said analog-to-digital converter and a delayed variant of said series of pulses and averaging said reflected variant over a period of time to obtain an interference signal.

17. An apparatus as claimed in claim 1, wherein said OSC equipment comprises a microprocessor for processing supervisory information carried over said supervisory channel.

18. An apparatus as claimed in claim 17, wherein said microprocessor controls said apparatus to operate in an OSC mode and an OTDR mode.

19. An apparatus as claimed in claim 18, wherein said microprocessor controls said pulse generator for varying the rate of said diagnostic pulse when in said OTDR mode.

* * * * *